United States Patent [19]

Rysgaard, Sr.

[11] 4,060,175
[45] Nov. 29, 1977

[54] DIAPHRAGM TANK COVER

[75] Inventor: John R. Rysgaard, Sr., St. Paul, Minn.

[73] Assignee: Fiberglass Specialty Co., Inc., St. Paul, Minn.

[21] Appl. No.: 702,218

[22] Filed: July 2, 1976

[51] Int. Cl.² .................. B65D 87/08; F17B 1/26
[52] U.S. Cl. ......................... 220/85 B; 23/285; 99/276
[58] Field of Search ............ 220/85 B; 23/285; 99/235

[56] References Cited

U.S. PATENT DOCUMENTS

| | | | |
|---|---|---|---|
| 1,716,950 | 6/1929 | Day | 220/85 B |
| 2,578,090 | 11/1951 | Plummer | 220/85 B |
| 2,624,490 | 1/1953 | Fino | 220/85 B |
| 2,633,172 | 3/1953 | Treiber | 220/85 B |
| 3,049,070 | 8/1962 | Hawk | 220/85 B |
| 3,122,985 | 3/1964 | Osborne | 220/85 B |

FOREIGN PATENT DOCUMENTS 2,024,119 11/1970 Germany .................. 220/85 B

*Primary Examiner*—George E. Lowrance
*Attorney, Agent, or Firm*—Dugger, Johnson & Westman

[57] ABSTRACT

A digester tank assembly for use in digester systems for anaerobic digestion of waste water sludge comprising a tank having a fixed exterior cover, and a diaphragm member mounted in the tank dividing the tank into upper and lower compartments, said diaphragm member being positioned above the normal sludge level and being movable relative to the sludge level to provide for regulation of gas pressure on the interior of the digestion tank and to allow for substantial variations in gas storage volume at generally uniform pressures. The diaphragm member is connected to a sliding stack that is guided with respect to the fixed cover so that the stack will be allowed to move with the diaphragm as the diaphragm position varies in accordance with the gas storage volume. The diaphragm carries a flowable ballast material that will shift as the diaphragm raises and lowers and which can be varied in volume to maintain the desired pressure on the inside of the digester tank.

7 Claims, 4 Drawing Figures

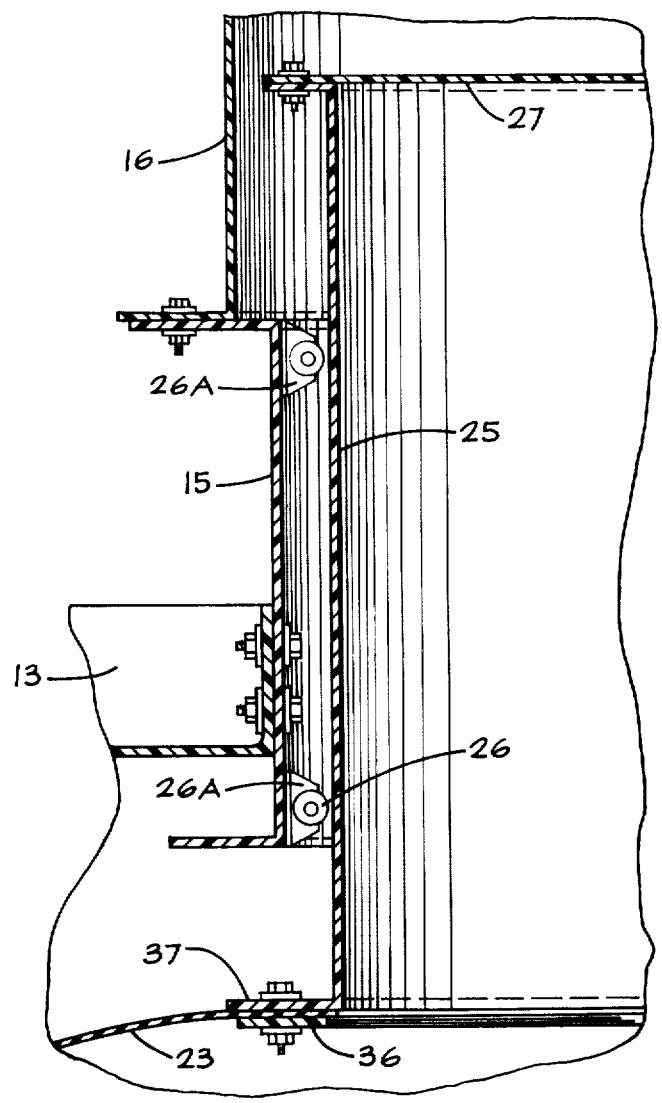
FIG. 2
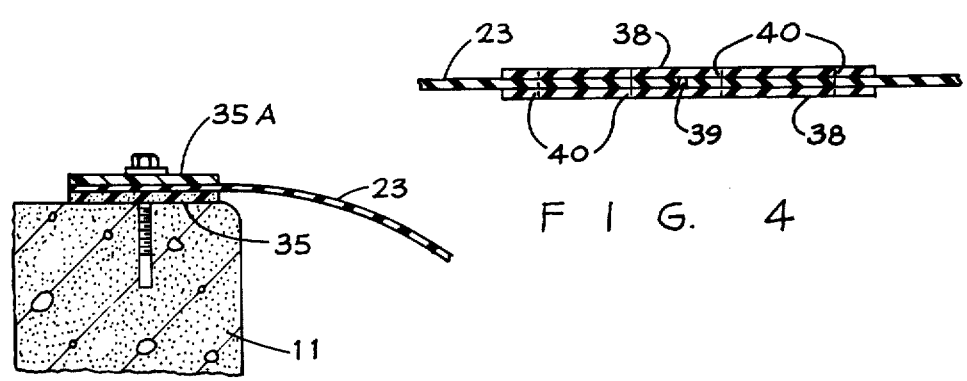
FIG. 3
FIG. 4

DIAPHRAGM TANK COVER

BACKGROUND OF THE INVENTION

1. Field of the Invention

The present invention relates to a digester tank construction for use in digestion systems for the anaerobic digestion of waste water sludge.

2. Prior Art

Various tanks incorporating interior movable diaphragms have been advanced in the art, and generally such diaphragms have been for following the level of liquid in a tank.

Examples of the prior art include U.S. Pat. No. 2,696,185 which shows a barge that has membranes dividing the barge into different tanks and which vary the volume of each of the tanks as liquid is either added or taken out of the respective tank.

U.S. Pat. No. 3,537,608 shows a fluid storage tank for storing two fluids of variable volume, for example oil and gasoline. U.S. Pat. No. 3,477,611 has a diaphragm which separates the atmosphere from the contained product and combines liquid and gas vapor from the contained product in one chamber, but provides no means for establishing a constant desired pressure. The device allows for a range in pressure with relief to the atmosphere coming only when the pressure achieves a certain level. U.S. Pat. No. 21,761 is a keg which has an interior lining that permits an air pocket to form behind the linear to divide the keg into two chambers.

U.S. Pat. No. 2,578,090 shows a diaphragm that is in contact with the level of liquid as the liquid varies in volume inside the container, and U.S. Pat. No. 2,670,100 also shows an adjustable diaphragm that adjusts itself to varying volumes of liquid and which may move off the top of the liquid when a generated gas is present.

Other examples of prior patents showing diaphragm type tanks include U.S. Pat. Nos. 1,716,950; 2,136,202; 3,749,165; and 3,902,624.

SUMMARY OF THE INVENTION

The present invention relates to digester tanks for use in anaerobic digestion systems for the digestion of waste water sludge including a covered tank and a flexible interior diaphragm dividing the tank into two compartments. The diaphragm carries ballast to regulate the pressure in the tank under diaphragm. The diaphragm is supported on a gas layer above the sludge level. The pressure is controlled at a safe, desired substantially uniform level during normal operation. The diaphragm will move to vary the gas volume inside the digester tank substantially between the upper and lower positions of the diaphragm.

A gas bleed-off hose is provided to permit removal of gas as it is generated by the digester. A sliding stack is attached to the diaphragm and the stack moves up and down as the diaphragm moves up and down. The gas bleed-off hose can be intermittently vented, or connected to a storage system or gas consuming device.

The diaphragm is connected to the peripheral wall of the tank using a fastening ring for security and reliability. The diaphragm itself can be made in sections if desired, and joined with an overlap seam arrangement that prevents leakage.

The pressure level regulated by the diaphragm can be varied by varying the amount of ballast material on the diaphragm. This provides wide possibilities in the control of the pressure and operation of the digester system.

BRIEF DESCRIPTION OF THE DRAWINGS

FIG. 2 is an enlarged vertical sectional view of a sliding center stack and support of the tank of FIG. 1;

FIG. 3 is a sectional view of an upper edge portion of the wall of the digester tank showing details of attachment of the diaphragm to the tank wall; and FIG. 4 is an enlarged sectional view of a typical junction seam between sections of the diaphragm.

DESCRIPTION OF THE PREFERRED EMBODIMENT

Figure 1:
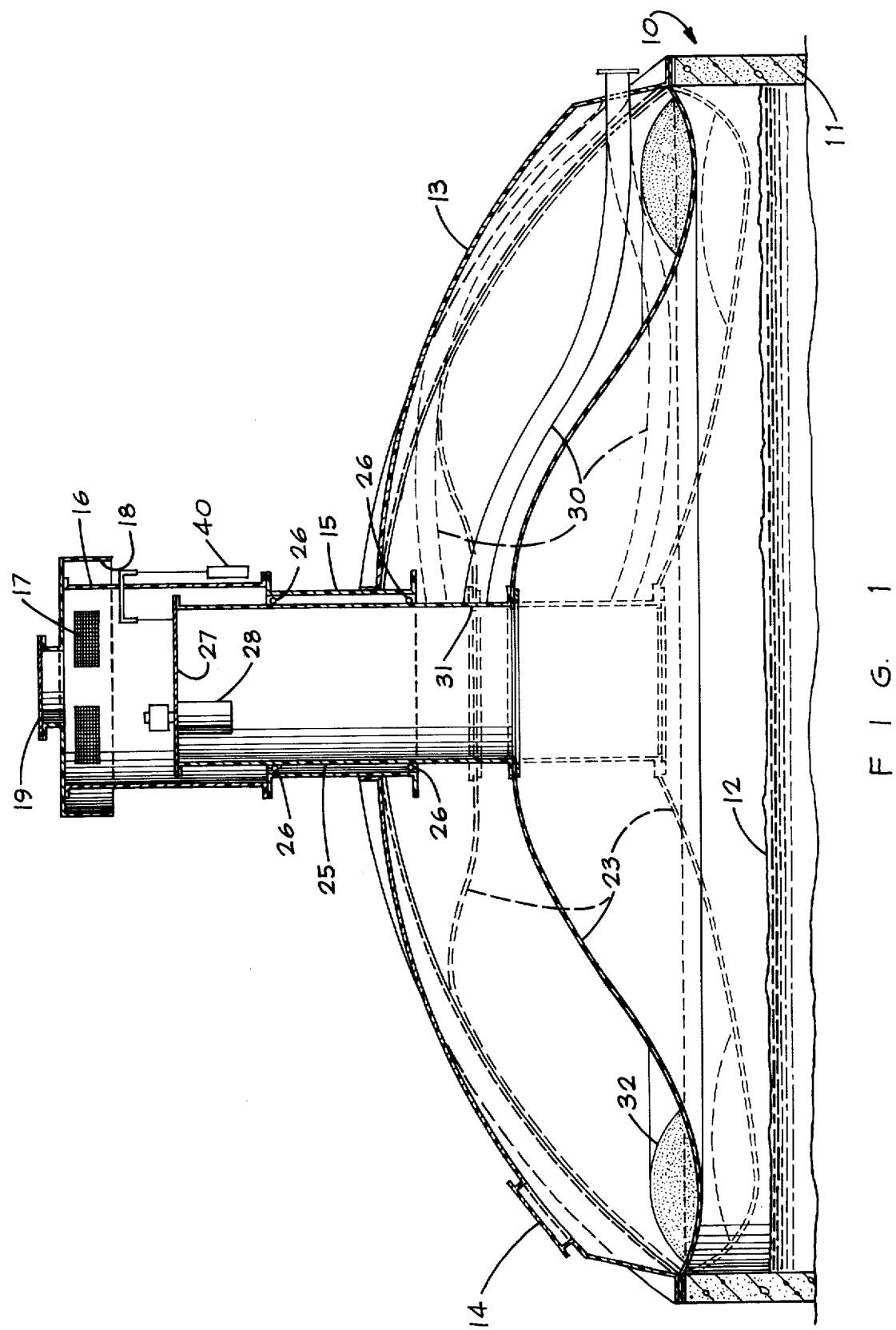
FIG. 1 is a partial vertical sectional view through a typical digester tank constructed according to the present invention.

A digester tank indicated generally at 10 as shown has a concrete annular or ring type wall 11 that is mounted in the usual manner in a digestion system, and which defines an interior enclosure in which waste water sludge indicated generally at 12 will be placed for anaerobic digestion. The tank wall 11 is made of concrete, as shown and is of any desired size. A tank cover member is indicated generally at 13. The tank cover member, which in the present form is a sectionalized fiberglass reinforced plastic cover is sealed along the upper edges of the tank and covers the tank with a dome shape. The fiberglass reinforced plastic cover 13 can be made into individual sections that are bolted together in more or less "pie" shaped sections. Such covers for digester tanks are well known in the art.

The cover 13 is a fixed cover, in that it does not float on the top of the sludge, as is sometimes done in digestion systems. The cover 13 and tank wall 11 define an interior space which is used for anaerobic digestion, and as can be seen a manhole 14 can be formed in the cover 13 for access to the interior of the tank. The manhole will normally be closed. The upper portions of the cover 13 adjacent the central axis of the circular wall tank 11, support a guide housing or sleeve 15 which in turn has a removable weather cover indicated generally at 16 supported at the top thereof. The cover 16 has breather vents 17, a skirt forming a rain cap indicated generally at 18, and also includes an access manhole 19 that is normally closed as well.

The tank is divided into two compartments by a flexible membrane or diaphragm 23 that is joined around its peripheral edges to the top of the tank wall 11, and which is supported on a gaseous layer which defines a chamber indicated generally at 24 above the sludge 12. The diaphragm or membrane 23 can be elastomeric coated fabric material that is flexible and inert to waste water and waste water gases, and as will be explained serves to provide a highly variable volume on the interior of the digestion tank dependent upon the gas pressure of the gases in the tank.

At the center portions of the diaphragm a gas dome or stack 25 is sealingly attached at its lower peripheral edge to the diaphragm. The interior of the stack is open to the chamber formed above the sludge by the diaphragm. The stack is mounted on the interior of the sleeve 15 and is movable in a vertical direction with respect thereto on suitable guide rollers 26 that are rotatably mounted on supports 26A (see FIG. 2). The rollers 26 can be located around the interior of the support sleeve 15 to provide adequate guiding for the stack or gas dome 25 and to permit the stack to move upwardly and downwardly with the diaphragm 23 without substantial restraint.

The upper end of the stack 25 has a cover 27 mounted thereon, and a flame arrester, pressure relief valve and vacuum breaker assembly indicated generally at 28 is used with the unit to provide for pressure relief if the diaphragm reaches the maximum extent of its travel and gas continues to build up. The flame arrester may be of the type normally used in digester systems.

Additionally, a gas bleed-off hose indicated generally at 30 is provided. The hose 30 is attached to the stack 25 as indicated at 31 and is open to the interior of the stack so that gas on the interior of the stack (and thus under the diaphragm) can be bled off or pumped off through the tube or hose 30 to a remote location. A suitable valve may be provided on the hose at the exterior of the tank. The hose 30 can lead to a storage tank where gas is stored or to a location where the gas is utilized.

A ring of ballast material indicated generally at 32 is provided on the upper surface of the diaphragm or membrane 23. The ballast is formed in an annular ring around the center portions of the diaphragm to provide a regulation in the pressure underneath the diaphragm 23. The more ballast, the greater the pressure required to raise it. As shown, when a ring of ballast is placed near the outer edges of the diaphragm the ballast can be a flowable granular material such as glass beads, sand, or suitable other inert, non-freezing ballast material that will slide radially as the diaphragm moves up or down, but which does not easily flow circumferentially around the diaphragm. It has been found that a free flowing liquid is not suitable because it will tend to flow circumferentially over to one side of the diaphgram rather than remain substantially uniformly positioned in a ring around the periphery.

When the digester system is operating gases will be formed above the sludge underneath the diaphragm 23 so that the diaphragm will be lifted by the pressure. The diaphragm will be maintained in a spaced relationship to the upper surface of the sludge. It can be seen that the diaphragm can move from a low position generally as shown in dotted lines in FIG. 1, to a high position generally as shown in dotted lines in FIG. 1, and in this way can vary the quantity of gas that is stored a substantial amount while maintaining a relatively constant pressure. When the diaphragm raises the ballast material will also raise and will shift more toward the wall of the tank. As the diaphragm lowers, as gas is bled off, the ballast material will lower and will slide toward the center of the tank.

The attachment devices used with the diaphragm are shown generally in FIGS. 2 and 3. A layer of a suitable mastic 35 is placed onto the upper surface of wall 11, and then the diaphragm is placed over the mastic. A ring of fiberglass reinforced plastic indicated generally at 35A is placed above the diaphragm 23 at its edges, and the diaphragm is then clamped into position on the wall, against the mastic with suitable bolts that are anchored in the concrete wall 11. The stack 25 also can be made of fiberglass reinforced plastic, and in this instance, a ring 36 is provided below a flange 37 that is integral with the stack 25, and then the ring 36 is clamped so that the membrane or diaphragm 23 is clamped between the ring and the flange 37 for secure sealing and attachment. Mastic may also be used at this connection. In this way, the diaphragm 23 and the stack 25 will move as a unit, and it should be noted that the stack 25 is relatively light, being made of fiberglass reinforced plastic so that it will move up and down in response to pressure underneath the stack itself.

The diaphragm 23 can be made in sections, and the seams between sections sealed as shown in FIG. 4. Pieces of material indicated generally at 38 which are the same material as that used for the membrane, are placed on top and bottom of the membrane or diaphragm 23, and overlap the seam indicated at 39, a substantial amount. These pieces of material 38 are then adhesively secured to the top and bottom of the diaphragm 23 with a suitable mastic so that they overlap the junction line between sections. Stitching indicated at 40 is used for securing the pieces of material 38 in place. The adhesive or mastic provides a gas tight seal, and the stitching holds the lapped pieces of material securely and mechanically in place.

The digester, as shown, with the ballast in place on the flexible diaphragm, provides means for maintaining a substantial and uniform counterpressure of a preselected level on the gas layer above the sludge and yet permits a substantial variation of volume of the gas that is present. The amount of pressure can be adjusted intermittently to meet operational changes by changing or adding to or subtracting from the ballast. The fiberglass cover or dome 13 provides a good seal and adequate protection for the tank, while the diaphragm which is flexible and movable provides for variations in volume under constant pressure.

The height of the diaphragm relative to a reference position may be indicated by a height indicator 40 which is shown as a weight connected by a cable to cover 27. The cable slides in a tube or on a pulley supported on cover 16 so the weight raises and lowers as the diaphragm moves. Other position indicators also may be used, such as manometers or mechanical devices.

What is claimed is:

1. In a tank for anerobic digestion of sludge including a wall forming a container for holding sludge and a fixed outer cover mounted over said tank, the improvement comprising a flexible diaphragm sealingly attached to said wall and overlying said tank below said cover and above sludge in the tank to form a gas tight chamber below the diaphragm, said diaphragm being supported at its periphery on said wall and spaced above sludge in the tank, a vent stack for regulating pressure attached to said diaphragm in the center portions thereof and opening directly to the chamber below the diaphragm and, passing through said fixed cover, means to slidably guide said vent stack with respect to said cover to guide said diaphragm and permit said diaphragm and stack to move between upper and lower positions spaced at different heights above said sludge as a function of gas volume under said diaphragm formed by said sludge, and to maintain a substantially constant pressure through out movement of said diaphragm between its upper and lower positions, and weight means on said diaphragm comprising a ballast material on the upper surface of said diaphragm which is movable with said diaphragm as the gas volume changes below said diaphragm.

2. The combination of claim 1 wherein said means to slidably guide said vent stack comprises an outer housing mounted on said cover and surrounding said vent stack, roller means mounted on the housing and engaging said vent stack, and a relief valve opening from said vent stack to atmosphere to control the maximum pressure in said gas tight chamber.

3. The combination as specified in claim 1 wherein said ballast material comprises a particulate material that changes in peripheral cross section as said diaphragm moves between its upper and lower positions, but does not flow freely circumferentially on said diaphragm.

4. The tank of claim 1 wherein said ballast material comprises particulate material that does not flow freely circumferentially on said diaphragm.

5. The tank of claim 1 wherein said wall is substantially cylindrical and has an upper edge surface, and said diaphragm is supported on said upper edge, means to seal said diaphragm to said upper edge comprising a layer of mastic between the diaphragm and upper edge, a ring member overlying said diaphragm at said upper edge, and means to clamp said ring toward said upper edge and force said diaphragm against said mastic and upper edge.

6. The tank of claim 1 and means to seal edges of said vent stack to said diaphragm including a flange on said stack and a ring clamping said diaphragm against said flange.

7. The tank of claim 6 wherein said diaphragm is made in sections of flexible material, said sections being joined to adjacent sections along junction edges, sealing means to seal said junction edges including separate pieces of material that overlie a junction edge on the top and bottom of adjacent diaphragm sections, adhesive means sealing the pieces of material to the diaphragm, and stitching on both sides of said junction edges extending through both pieces of material at that junction edge and through the adjacent diaphragm sections to secure the pieces of material in position.

* * * * *